(12) United States Patent
Hayashi et al.

(10) Patent No.: US 11,203,945 B2
(45) Date of Patent: Dec. 21, 2021

(54) STATOR VANE OF FAN OR COMPRESSOR

(71) Applicant: IHI CORPORATION, Koto-ku (JP)

(72) Inventors: Ryosuke Hayashi, Koto-ku (JP); Ryuichi Okada, Koto-ku (JP); Takeshi Murooka, Koto-ku (JP); Tomonori Enoki, Koto-ku (JP)

(73) Assignee: IHI CORPORATION, Koto-ku (JP)

( * ) Notice: Subject to any disclaimer, the term of this patent is extended or adjusted under 35 U.S.C. 154(b) by 0 days.

(21) Appl. No.: 16/893,556

(22) Filed: Jun. 5, 2020

(65) Prior Publication Data

US 2020/0300102 A1   Sep. 24, 2020

Related U.S. Application Data

(63) Continuation of application No. PCT/JP2018/024392, filed on Jun. 27, 2018.

(30) Foreign Application Priority Data

Dec. 20, 2017   (JP) .............................. JP2017-244148

(51) Int. Cl.
*F01D 9/02*   (2006.01)
*F01D 5/14*   (2006.01)

(52) U.S. Cl.
CPC ............... *F01D 9/02* (2013.01); *F01D 5/141* (2013.01); *F01D 5/145* (2013.01);
(Continued)

(58) Field of Classification Search
CPC . F01D 9/02; F01D 9/041; F01D 5/141; F01D 5/145; F05D 2210/34; F05D 2240/121–124; F05D 2270/17
See application file for complete search history.

(56) References Cited

U.S. PATENT DOCUMENTS 6,802,474 B2 * 10/2004 Sonoda ................... F01D 5/141
                                                      244/35 R
8,152,473 B2 *  4/2012 Clemen ................... F01D 9/041
                                                      416/241 R
(Continued)

FOREIGN PATENT DOCUMENTS

EP   1 760 321 A2   3/2007
EP   1 927 724 A2   6/2008
(Continued)

OTHER PUBLICATIONS

International Search Report dated Sep. 18, 2018 in PCT/JP2018/024392 filed Jun. 27, 2018, 1 page.
(Continued)

*Primary Examiner* — Courtney D Heinle
*Assistant Examiner* — Danielle M. Christensen
(74) *Attorney, Agent, or Firm* — Oblon, McClelland, Maier & Neustadt, L.L.P.

(57) ABSTRACT

To provide a stator vane of a fan or compressor that is reduced in loss by enlarging a laminar flow area over a blade surface. With the stator vane, provided that an angle formed by a tangent to the blade surface at a point and the axial direction of the turbofan engine, that is, a parameter that is a blade surface angle normalized is referred to as a normalized blade surface angle, an upper limit is set for the change rate in the chord direction of the normalized blade surface angle on the pressure surface, and an upper limit is set for the normalized blade surface angle at a predetermined location in the chord direction on the suction surface.

1 Claim, 4 Drawing Sheets

(52) U.S. Cl.
CPC .... *F05D 2210/34* (2013.01); *F05D 2240/121* (2013.01); *F05D 2240/122* (2013.01); *F05D 2240/123* (2013.01); *F05D 2240/124* (2013.01); *F05D 2270/17* (2013.01)

(56) References Cited

U.S. PATENT DOCUMENTS

| | | |
|---|---|---|
| 2017/0097011 A1 | 4/2017 | Pallot et al. |
| 2017/0167503 A1 | 6/2017 | Gallagher et al. |
| 2020/0088039 A1* | 3/2020 | Okada ............... F01D 5/141 |

FOREIGN PATENT DOCUMENTS

| | | |
|---|---|---|
| EP | 2 275 643 A2 | 1/2011 |
| EP | 2 472 061 A1 | 7/2012 |
| EP | 3 633 207 A1 | 4/2020 |
| FR | 3 049 013 A1 | 9/2017 |
| WO | WO 2016/024461 A1 | 2/2016 |

OTHER PUBLICATIONS

Extended European Search Report dated Apr. 8, 2021 in European Patent Application No. 18893318.8, 8 pages.

\* cited by examiner

STATOR VANE OF FAN OR COMPRESSOR

TECHNICAL FIELD

The present disclosure relates to a stator vane of a fan or compressor that is a component of a turbofan engine. In particular, it relates to a stator vane of a fan or compressor that is reduced in loss by controlling deceleration of a flow around the blade and enlarging a laminar flow area over the blade surface.

BACKGROUND ART

A fan or compressor that is a component of a turbofan engine is provided with a rotor blade and a stator vane. FIG. 3 shows a stator vane as an example of the stator vane. Note that the terms "radial direction", "circumferential direction" and "axial direction" used in the following description coincide with the radial direction, the circumferential direction and the axial direction of a turbofan engine incorporating the stator vane, respectively.

FIG. 3 is a schematic perspective view of a stator vane SV. The stator vane SV includes a blade part AF, and an outer band OB and an inner band IB. The blade part AF is a part that extends in the radial direction in an annular flow channel through which air as a working fluid flows. Such blade parts AF are disposed at regular intervals in the circumferential direction to form a cascade of blades. The outer band OB and the inner band IB are plate-like parts connected to a radially outer end and a radially inner end of the blade part AF, respectively. A plurality of such outer bands OB is arranged adjacent to each other in the circumferential direction, thereby forming an outer boundary surface of the annular flow channel described above, and a plurality of such inner bands IB is arranged adjacent to each other in the circumferential direction, thereby forming an inner boundary surface of the annular flow channel described above.

Both FIGS. 4A and 4B are cross-sectional views taken along the line I-I in FIG. 3, showing the cross-sectional shape, that is, airfoil, of the blade part AF at a position in the span direction (a position in the height direction of the blade part AF). In this drawing, the arrows X and θ indicate the axial direction and the circumferential direction, respectively.

The airfoil includes a concave pressure surface PS and a convex suction surface SS that extend between a leading edge LE and a trailing edge TE. A line segment connecting the leading edge LE and the trailing edge TE to each other is referred to as a chord. The length of the chord is referred to as a chord length, and the direction along the chord is referred to as a chord direction. Note that the terms "pressure surface" and "suction surface", which originally mean curved surfaces of the blade part, are used to refer to curved lines forming the contour of the airfoil in this specification.

As shown in FIGS. 4A and 4B, the airfoil is curved along a camber line (airfoil center line) CL, and the curve can be regarded as a change in blade surface angle ($\beta$) from the leading edge LE to the trailing edge TE.

As shown in FIG. 4A, the blade surface angle of the suction surface SS, that is, the suction surface's blade surface angle ($\beta SS$) is an angle formed by a tangent (TSS) to the suction surface SS at a point (PSS) and the axial direction (X). The suction surface's blade surface angle at the leading edge LE will be referred to as a suction surface's inlet blade surface angle ($\beta SSin$), and the blade surface angle at the trailing edge TE will be referred to as a suction surface's exit blade surface angle ($\beta SSex$).

Similarly, as shown in FIG. 4B, the blade surface angle of the pressure surface PS, that is, the pressure surface's blade surface angle ($\beta PS$) is an angle formed by a tangent (TPS) to the pressure surface PS at a point (PPS) and the axial direction (X).

In general, the suction surface's inlet blade surface angle $\beta SSin$ is greater than the suction surface's exit blade surface angle $\beta SSex$, and the suction surface's blade surface angle $\beta SS$ gradually decreases as it goes from the leading edge LE to the trailing edge TE.

On the other hand, in general, the pressure surface's blade surface angle $\beta PS$ first temporarily increases from the value at the leading edge LE (that is, the tangent TPS rotates counterclockwise in the drawing) in a region near the leading edge LE and then gradually decreases (that is, the tangent TPS rotates clockwise in the drawing) as it goes toward the trailing edge TE. This is because the pressure surface PS locally curves outward in the region near the leading edge LE.

As a parameter that objectively indicates the way of change of the blade surface angle, a normalized blade surface angle is introduced.

A parameter that indicates the way of change of the suction surface's blade surface angle $\beta SS$, that is, the suction surface's normalized blade surface angle ($\delta SS$) is defined by the following formula (1).

$$\delta ss=(\beta SSin-\beta SS)/(\beta SSin-\beta SSex) \qquad \text{formula (1)}$$

As can be seen from the formula (1), the suction surface's normalized blade surface angle $\delta SS$ is a parameter of the decrease of the suction surface's blade surface angle $\beta SS$ at a point on the suction surface SS from the suction surface's blade surface angle at the leading edge LE (the suction surface's inlet blade surface angle $\beta SSin$) normalized with the total decrease of the suction surface's blade surface angle from the leading edge LE to the trailing edge TE (the suction surface's inlet blade surface angle $\beta SSin$ minus the suction surface's exit blade surface angle $\beta SSex$), and monotonically increases as it goes from the leading edge LE ($\delta SS=0$) to the trailing edge TE ($\delta SS=1$).

On the other hand, a parameter that indicates the way of change of the pressure surface's blade surface angle $\beta PS$, that is, the pressure surface's normalized blade surface angle ($\delta PS$) is defined by the following formula (2).

$$\delta PS=(\gamma in-\beta PS)/(\gamma in-\gamma ex) \qquad (2)$$

As shown in FIG. 4B, $\gamma$ denotes an angle formed by a tangent (TCL) to the camber line CL at a point (PCL) and the axial direction (X), that is, a camber line angle, $\gamma in$ denotes a camber line angle at the leading edge LE, that is, an inlet camber line angle, and $\gamma ex$ denotes a camber line angle at the trailing edge TE, that is, an exit camber line angle.

In the formula (2), the camber line angle $\gamma$ is used for normalization, rather than the pressure surface's blade surface angle $\beta PS$ at the leading edge LE and the trailing edge TE. This is because, on the pressure surface PS, the difference between the pressure surface's blade surface angle $\beta PS$ at the leading edge LE and the pressure surface's blade surface angle $\beta PS$ at the trailing edge TE (which corresponds to the denominator in the formula (1)) is very small, and therefore the value of $\delta PS$ is too great, which is undesirable.

According to the change of the pressure surface's blade surface angle $\beta PS$ described above, the pressure surface's normalized blade surface angle $\delta PS$ first temporarily decreases to a minimum as it goes from the leading edge LE toward the trailing edge TE, and then monotonically increases as it goes to the trailing edge TE.

As can be seen, there is a correspondence between the change of the normalized blade surface angle from the leading edge LE to the trailing edge TE and the change of the blade surface angle, and therefore, the sharpness of the change of the blade surface angle (or in other words, the magnitude of the curve of the airfoil) can be regarded as the sharpness of the change of the normalized blade surface angle. In addition, using the normalized blade surface angle allows comparison of the sharpness of the change of the blade surface angle between different blades.

Patent Document 1 discloses a blade of a compressor that is reduced in loss by adjusting the curve of the airfoil. With the blade disclosed in the document, provided that the angle formed by a tangent at a point on the camber (center line) of the airfoil and the axial direction is denoted as β', and the same angles at the leading edge and the trailing edge are denoted as βin' and βex', respectively, a point on the camber at which the parameter (δ') defined by the following formula (3) equals to 0.5 is arranged within a predetermined range in the chord direction.

$$\delta'=(\beta in'-\beta')/(\beta in'-\beta ex') \quad \text{formula (3)}$$

RELATED ART DOCUMENT

Patent Document

Patent Document 1: International Publication No. WO 2016/024461

SUMMARY OF THE DISCLOSURE

Problems to be Solved by the Disclosure

An inter-blade flow channel formed between two blade parts located adjacent to each other in the circumferential direction is a diffused flow channel the area of which increases as it goes from the inlet side (upstream side) to the exit side (downstream side) of the blade. Therefore, the velocity of the flow decreases, that is, the flow decelerates, as the flow channel area increases as the air flows from the inlet side to the exit side of the blade (because the velocity of the flow flowing into the inter-blade flow channel for the stator vane of a fan or a compressor is generally subsonic).

In this process, at a location where the flow channel area sharply increases, a rapid deceleration of the flow occurs, and the boundary layer formed over the blade surface transitions from the laminar state to the turbulent state.

In the laminar boundary layer, the velocity gradient of the flow near the wall surface is small, so that the shearing stress, that is, the frictional stress, on the wall surface is low. However, in the turbulent boundary layer, the velocity gradient of the flow near the wall surface is great, so that the frictional stress is high. This means that the larger the area in which the laminar boundary layer is formed (laminar flow area) and the smaller the area in which the turbulent boundary layer is formed (turbulent flow area) on the blade surface, the smaller the frictional drag on the blade becomes, and smaller the friction loss of the inter-blade flow becomes.

Therefore, in designing the airfoil, it is necessary to ensure that the location where the boundary layer transitions from the laminar state to the turbulent state is as downstream as possible in order to make the laminar flow area as large as possible.

With the conventional stator vane, the boundary layer over the blade surface transitions early (that is, on the upstream side) from the laminar state to the turbulent state, so that the laminar flow area is small, and therefore, the friction loss of the inter-blade flow is high.

Detailed analysis of the velocity distribution of the flow around the conventional stator vane has shown that a rapid deceleration of the flow occurs in a relatively upstream area on the suction surface, and the boundary layer transitions in the area.

As described above, it can be considered that the region in which the rapid deceleration of the flow occurs is the region in which the flow channel area of the inter-blade flow channel sharply increases. In this regard, the sharpness of the increase of the flow channel area of the inter-blade channel corresponds to the sharpness of the decrease of the blade surface angle. That is, if the blade surface angle sharply decreases at a location, in a region downstream of that location, the flow channel area of the inter-blade channel sharply increases, so that it is highly likely that the flow sharply decelerates and the transition of the boundary layer from the laminar state to the turbulent state occurs.

As can be seen from the foregoing, if the deceleration of the flow around the blade is appropriately controlled by adjusting the sharpness of the decrease of the blade surface angle and thereby adjusting the sharpness of the increase of the flow channel area of the inter-blade flow channel, the transition of the boundary layer over the blade surface can be delayed (that is, the transition location can be shifted to the downstream side) to enlarge the laminar flow area, and thereby reducing the friction loss of the inter-blade flow.

The present disclosure has been devised based on the above considerations, and an object of the present disclosure is to provide a stator vane of a fan or compressor that is reduced in loss by appropriately controlling a deceleration of a flow around the blade to delay a transition of a boundary layer over a blade surface (that is, to shift the transition location to the downstream side) to enlarge a laminar flow area over the blade surface.

Means for Solving the Problems

In order to solve the problem described above, a stator vane according to the present disclosure is a stator vane of a fan or compressor that is a component of a turbofan engine, wherein an airfoil, which is a cross section, of the stator vane at each location in a height direction is formed by a concave pressure surface and a convex suction surface each of which extends between a leading edge and a trailing edge of the stator vane, and in the cross section, provided that an angle formed by a tangent at a point on the suction surface and an axial direction of the turbofan engine is referred to as a suction surface's blade surface angle (βSS), the suction surface's blade surface angle at the leading edge is referred to as a suction surface's inlet blade surface angle (βSSin), the suction surface's blade surface angle at the trailing edge is referred to as a suction surface's exit blade surface angle (βSSex), and a parameter (δSS) defined by the formula (1) is referred to as a suction surface's normalized blade surface angle, provided that an angle formed by a tangent at a point on the pressure surface and the axial direction of the turbofan engine is referred to as a pressure surface's blade surface angle (βPS), an angle formed by a tangent at a point on a camber line of the airfoil and the axial direction of the turbofan engine is referred to as a camber line angle, the camber line angle at the leading edge is referred to as an inlet camber line angle (γin), the camber line angle at the trailing edge is referred to as an exit camber line angle (γex), and a parameter (δPS) defined by the formula (2) is referred to as a pressure surface's normalized blade surface angle, and provided that a line segment connecting the leading edge and the trailing edge is referred to as a chord, a length of the chord is referred to as a chord length (c), and a parameter (xc) defined as a distance (x) from a point on the pressure surface or suction surface to the leading edge measured in a direction parallel with the chord divided by the chord length (c) is referred to as a chord ratio, the suction surface's normalized blade surface angle at a location where the chord ratio is 0.05 is equal to or less than 0.35, the suction surface's normalized blade surface angle at a location where the chord ratio is 0.34 is equal to or less than 0.62, and a change rate (d(δPS)/dxc) in a chord direction of the pressure surface's normalized blade surface angle in a range of the chord ratio from 0 to 0.95 is equal to or less than 0.9.

$$\delta SS=(\beta SSin-\beta SS)/(\beta SSin-\beta SSex) \quad (1)$$

$$\delta PS=(\gamma in-\beta PS)/(\gamma in-\gamma ex) \quad (2)$$

Effects of the Disclosure

The present disclosure provides a beneficial effect that the laminar flow area is enlarged and the friction loss is reduced by delaying the transition of the boundary layer over the blade surface from the laminar state to the turbulent state (that is, shifting the transition location to the downstream side).

MODE FOR CARRYING OUT THE DISCLOSURE

In the following, an embodiment of the present disclosure will be described in detail with reference to the drawings.

With the conventional stator vane, a sharp deceleration of the flow occurs in a region where a chord ratio is from about 0.20 to 0.35 on the suction surface. This means that the suction surface's blade surface angle sharply decreases or, in other words, the suction surface's normalized blade surface angle sharply increases in the region. The chord ratio (xc), which is a non-dimensional value, is the distance (x) from the leading edge measured in the chord direction divided by the chord length (c).

For the pressure surface, also with the conventional stator vane, the change rate of the pressure surface's blade surface angle preferably has an upper limit in order to maintain a boundary layer over the blade surface in a laminar state.

In view of this, a stator vane according to the embodiment of the present disclosure has an airfoil obtained by modifying the airfoil of the conventional stator vane based on the following principles.

(1) For the suction surface, in the region where the chord ratio is about 0.20 to 0.35, the change of the suction surface's blade surface angle is reduced in order to reduce the deceleration of the flow. To this end, in a region upstream of that region where the chord ratio is about 0.05, the change of the suction surface's blade surface angle is increased with the maximum value of the flow velocity in the region kept to be equal to or less than the same value for the conventional stator vane.

(2) For the pressure surface, an upper limit is set for the change rate (d(δPS/dxc)) in the chord direction of the pressure surface's normalized blade surface angle (δPS).

Figure 1:
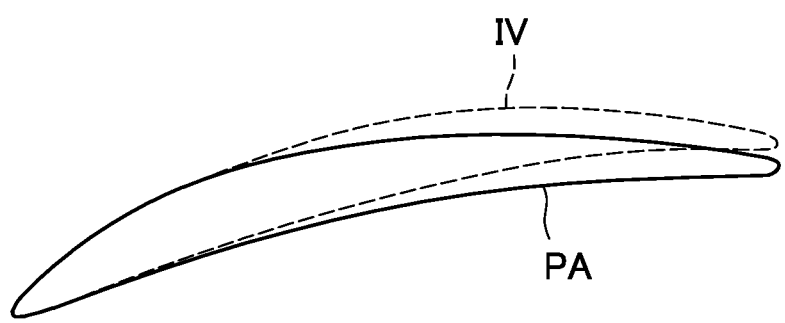
FIG. 1 is a schematic diagram for illustrating a cross-sectional shape (airfoil), at a location in a span direction, of a stator vane according to an embodiment of the present disclosure for comparison with a conventional stator vane.
Figure 2A:
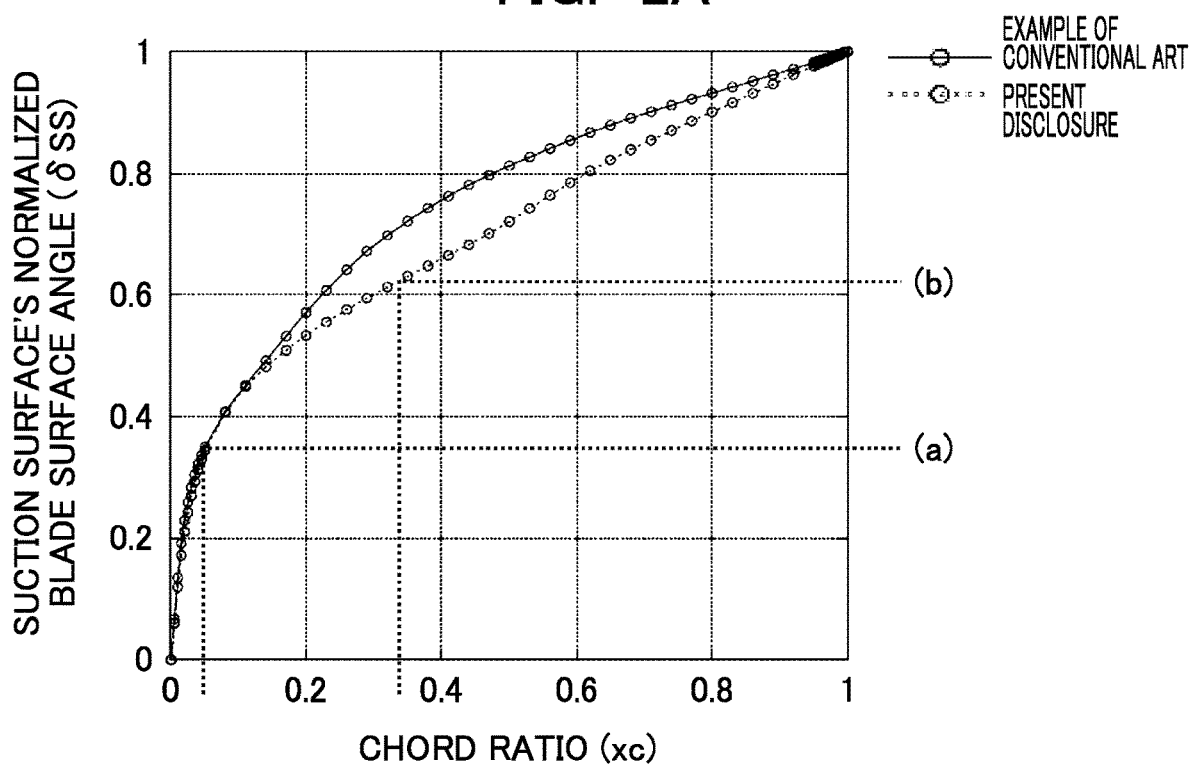
FIG. 2A is a graph showing a distribution in a chord direction of a suction surface's normalized blade surface angle of the stator vane according to the embodiment of the present disclosure, for comparison with the conventional stator vane.
Figure 2B:
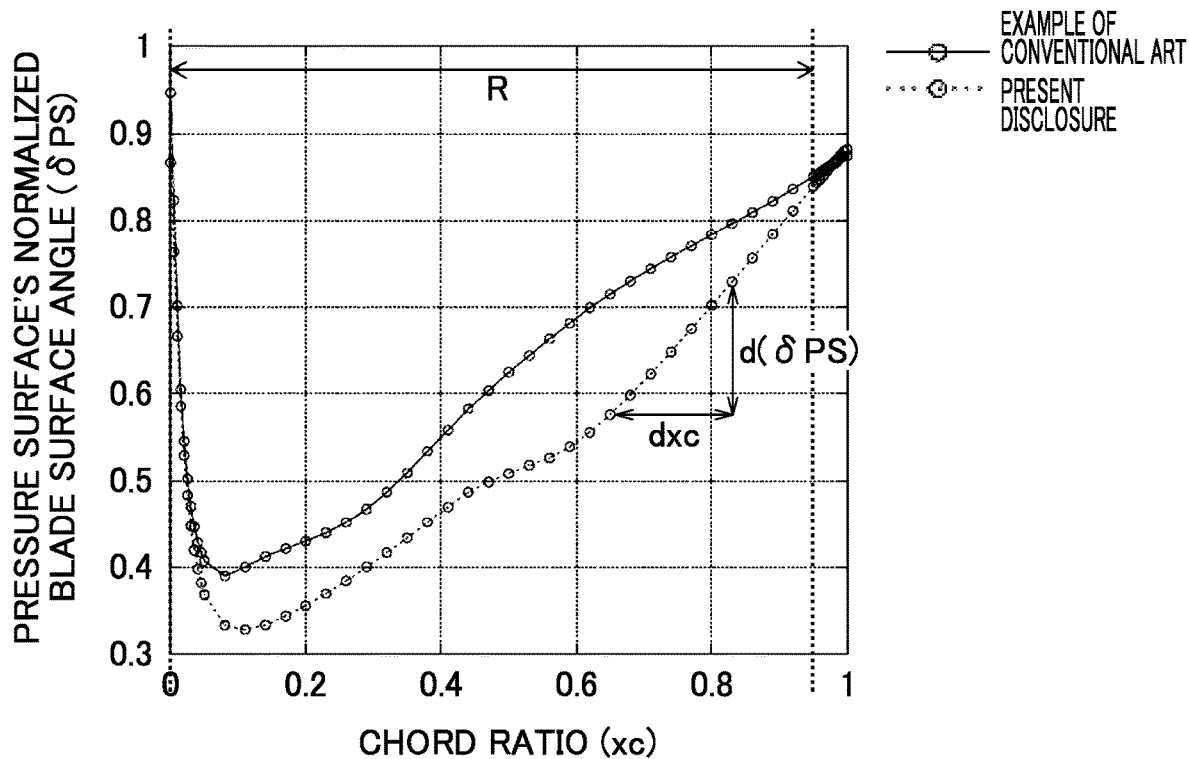
FIG. 2B is a graph showing a distribution in the chord direction of the pressure surface's normalized blade surface angle of the stator vane according to the embodiment of the present disclosure, for comparison with the conventional stator vane.
Figure 3:
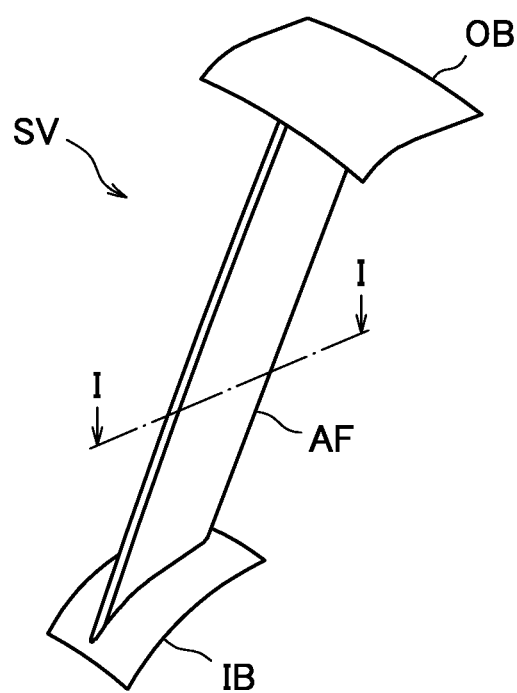
FIG. 3 is a schematic perspective view of a stator vane of a turbofan engine.
Figure 4A:
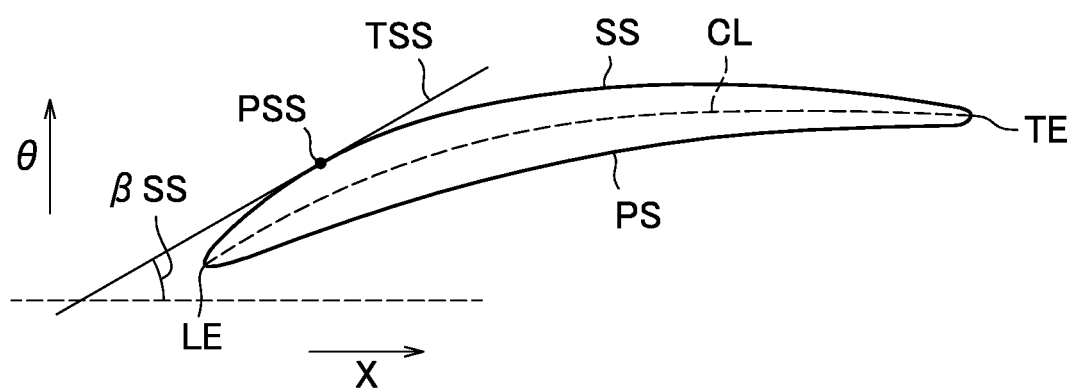
FIG. 4A is a cross-sectional view (a diagram showing a cross-sectional shape (airfoil) of a stator vane) taken along the line I-I in FIG. 3 for illustrating a definition of a suction surface's blade surface angle.
Figure 4B:
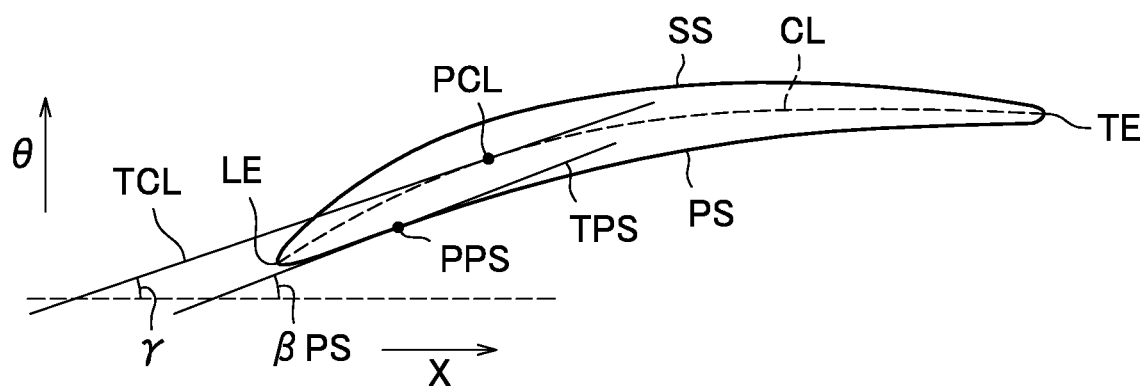
FIG. 4B is a cross-sectional view (a diagram showing a cross-sectional shape (airfoil) of the stator vane) taken along the line I-I in FIG. 3 for illustrating a definition of a pressure surface's blade surface angle.

FIG. 1 shows a cross-sectional shape (airfoil) IV, at a location in a span direction, of the stator vane according to the embodiment of the present disclosure provided as described above for comparison with the airfoil PA of the conventional stator vane. FIGS. 2A to 2B show distributions in the chord direction of the normalized blade surface angle of the stator vane according to the embodiment of the present disclosure for comparison with the conventional stator vane. FIG. 2A shows a distribution of the suction surface's normalized blade surface angle, and FIG. 2B shows a distribution of the pressure surface's normalized blade surface angle. In these drawings, the vertical axis indicates the normalized blade surface angle, the horizontal axis indicates the location in the chord direction, and the location in the chord direction is indicated in terms of chord ratio xc.

As shown in FIG. 2A, on the suction surface, the suction surface's normalized blade surface angle δSS at a location where the chord ratio is 0.05 is set to be equal to or less than 0.35 (see (a) in the graph), thereby keeping the maximum value of the flow velocity in a region near the location equal to or less than the same value for the conventional stator vane and at the same time making the change of the suction surface's normalized blade surface angle δSS in a region downstream of the location gentler, thereby reducing the deceleration in the region where the chord ratio is about 0.20 to 0.35.

As shown in FIG. 2B, on the pressure surface, in the range of the chord ratio from 0 to 0.95 shown by the arrow R in the drawing, the upper limit value of the change rate (d(δPS)/dxc) in the chord direction of the pressure surface's normalized blade surface angle (δPS) is set at 0.9, thereby preventing transition of the boundary layer to a turbulent state.

As can be seen from the above description, with the stator vane according to the embodiment of the present disclosure, compared with the conventional stator vane, the deceleration of the flow around the vane is more appropriately controlled by adjusting the way of change of the normalized blade surface angle, and as a result, the laminar flow area over the blade surface is enlarged, and loss is reduced.

With the stator vane according to the embodiment of the present disclosure, the transition location on the suction surface is a location where the chord ratio is 0.34, and the suction surface's normalized blade surface angle at the transition location is 0.62.

Therefore, it can be considered that, by setting the suction surface's blade surface angle at the transition location to be equal or less than the same value for the stator vane according to the embodiment of the present disclosure, the laminar flow area over the blade surface can be enlarged beyond the laminar flow area of the stator vane according to the embodiment of the present disclosure. Specifically, conditions for achieving this are as follows (see (b) in the graph in FIG. 2A).

The suction surface's normalized blade surface angle at a location where the chord ratio is 0.34 is equal to or less than 0.62.

With the foregoing in mind, the stator vane according to the embodiment of the present disclosure meets the following conditions.

On the suction surface, the suction surface's normalized blade surface angle δSS at a location where the chord ratio is 0.05 is equal to or less than 0.35.

On the suction surface, the suction surface's normalized blade surface angle δSS at a location where the chord ratio is 0.34 is equal to or less than 0.62.

On the pressure surface, in a range of the chord ratio from 0 to 0.95, the change rate (d(δPS)/dxc) in the chord direction of the pressure surface's normalized blade surface angle δPS is equal to or less than 0.9.

Although an example where the blade according to the present disclosure is used as a stator vane of a fan that is a component of a turbofan engine has been described above, the blade according to the present disclosure has a wide variety of applications and can also be used as a stator vane of a compressor of a gas turbine other than the turbofan engine or a fan or compressor as a stand-alone device.

EXPLANATION OF REFERENCE SIGNS

SV stator vane
AF blade part
OB outer band
IB inner band
PS pressure surface
SS suction surface
LE leading edge
TE trailing edge
CL camber line
β blade surface angle
δ normalized blade surface angle
γ camber line angle

The invention claimed is:

1. A stator vane of a fan or compressor that is a component of a turbofan engine, comprising:
a blade part, an outer band, and an inner band,
wherein an airfoil, which is a cross section, of the stator vane at each location in a height direction is formed by a concave pressure surface and a convex suction surface each of which extends between a leading edge and a trailing edge of the stator vane, and
in the cross section,
wherein an angle formed by a tangent at a point on the suction surface and an axial direction of the turbofan engine is referred to as a suction surface's blade surface angle ($\beta SS$), the suction surface's blade surface angle at the leading edge is referred to as a suction surface's inlet blade surface angle ($\beta SSin$), the suction surface's blade surface angle at the trailing edge is referred to as a suction surface's exit blade surface angle ($\beta SSex$), and a parameter ($\delta SS$) defined by a formula (1) is referred to as a suction surface's normalized blade surface angle:

$$\delta SS = (\beta SSin - \beta SS)/(\beta SSin - \beta SSex) \quad \text{formula (1)}$$

wherein an angle formed by a tangent at a point on the pressure surface and the axial direction of the turbofan engine is referred to as a pressure surface's blade surface angle ($\beta PS$), an angle formed by a tangent at a point on a camber line of the airfoil and the axial direction of the turbofan engine is referred to as a camber line angle, the camber line angle at the leading edge is referred to as an inlet camber line angle ($\gamma in$), the camber line angle at the trailing edge is referred to as an exit camber line angle ($\gamma ex$), and
a parameter ($\delta PS$) defined by formula (2) is referred to as a pressure surface's normalized blade surface angle:

$$\delta PS = (\gamma in - \beta PS)/(\gamma in - \gamma ex) \quad (2)$$

wherein a line segment connecting the leading edge and the trailing edge is referred to as a chord, a length of the chord is referred to as a chord length (c), and a parameter (xc) defined as a distance (x) from a point on the pressure surface or suction surface to the leading edge measured in a direction parallel with the chord divided by the chord length (c) is referred to as a chord ratio,
the suction surface's normalized blade surface angle at a location where the chord ratio is 0.05 is equal to or less than 0.35,
the suction surface's normalized blade surface angle at a location where the chord ratio is 0.34 is equal to or less than 0.62, and
a change rate (d(δPS)/dxc) in a chord direction of the pressure surface's normalized blade surface angle in a range of the chord ratio from 0 to 0.95 is equal to or less than 0.9.

* * * * *